Patented Sept. 4, 1945

2,384,064

UNITED STATES PATENT OFFICE 2,384,064

TREATMENT OF ROSIN WITH AMINES

László Auer, South Orange, N. J.

No Drawing. Application January 25, 1943,
Serial No. 473,547

9 Claims. (Cl. 260—106)

This invention relates to treatment of rosin to modify the properties thereof, the invention being especially concerned with a treatment process involving the use of certain aromatic amines or aromatic amino-compounds, of types set out more fully hereinafter. The invention also is concerned with improved modified rosin products produced by treatment with amino-compounds.

The present application is a continuation-in-part of my copending application Serial No. 383,049, filed March 12, 1941, issued as Patent 2,309,088, January 26, 1943.

Various rosin materials constitute a valuable source of raw materials for a number of purposes, for instance, in the plastics and coating composition industries. The invention is concerned with the modification of the properties of rosin so as to better fit the rosin for use in various industries such as those mentioned above.

For instance, it is contemplated that treatment according to this invention may alter and improve various characteristics not only of the rosin itself but also of coatings containing such treated rosin products, for example, water resistance, alkali resistance, solubility, etc.

Briefly described, the process involves heating the rosin in the presence of the amino-compound selected, the treatment being continued for the time required to bring about the desired modifications.

Before considering the process in detail, reference is now made to the amino-compounds herein contemplated for use.

Treating agent

According to the invention, aromatic mono-primary amines, or substitution products thereof, homologues and their derivatives, and also salts of the amines or substitution products may be employed. These amino-compounds may be represented by the general formula given below, and hereinafter identified as general Formula I.

R—NH₂ where R=grouping containing at least 1 aryl radical.

Moreover, the invention is particularly concerned with amino-compounds of the class which may be represented by the following general formula, hereinafter identified as general Formula II.

X<sub>a</sub>—R—NH₂ where

R=at least 1 aryl radical
X=nitro-, sulfo-, halo-, alkyl-, aryl-, aralkyl-, acyl-, aracyl-, hydroxy, CHOH, carboxy, azo-, CHO, SH, CN, CO, CS or SO radicals, or sulfur or oxygen

Here again it may be mentioned that the compounds coming within the general formula may also be used in the form of their salts.

Examples of mono-primary amines coming within the scope of general Formula II are:

Beta-naphthylamine
Alpha-naphthylamine

In the foregoing general Formula II, it is to be understood that the term "aryl" is used to identify the aromatic ring plus hydrogen atoms.

Examples of various complex amino-compounds, for instance, substituted mono-amines, coming within the scope of general Formula II are as follows:

4-chloro-o-anisidine
Sodium 2:6:8 naphthylamine disulphonate
Sodium 1:8:3:6 aminonaphthol disulphonate
2:6 naphthylamine sulphonic acid
2:1 naphthylamine sulphonic acid
Beta-naphthylamine 3:6:8 trisulphonic acid
m-Xylidine sulphonic acid
p-Toluidine m-sulphonic acid
m-Nitroaniline hydrochloride
Amino-azo-benzene
Amino-azo-benzene sulphate
Trichloraniline hydrochloride
Dinitroaniline
Aminosalicylic acid
Naphthylamines also containing sulphonic, hydroxy, and other substituent groups.

An example of a complex mixed amino-compound coming within the scope of general Formula I is: eurhodine.

From the above it will be seen that quite a wide variety of aromatic mon-primary amino-compounds may be employed. Salts of amines and also of substitution products thereof are also of many different types, as will readily be appreciated.

Various of the classes of compounds which may be employed, and also various individual compounds, yield somewhat different characteristics in the treated product, so that selection of the modifying agent should be made in accordance with the properties desired in the product.

It may be mentioned that, as compared with certain other aromatic amino-compounds, many of the primary amines are capable of producing a product having somewhat lower acid value. Again, as compared with certain other amino-compounds, the mono-amines are frequently of especial advantage where it is desired to increase the solubility of the product.

Although the treated rosin products of the present invention have advantageous properties when employed in varnishes or in varnish bases, such products may also be employed for many other purposes.

Use of the expression "varnish base" herein, means all or part of the varnish solids, i. e., all or part of the film forming ingredients of the varnish base. Such varnish bases or their dispersions (for instance, solutions) may, of course, be employed either clear or pigmented. Usually the varnish base contains both the resinous ingredient and a fatty oil ingredient, for example, drying or semi-drying fatty oils.

With regard to the action of the modifying agents, it should further be mentioned that many of the amino-compounds contemplated for use incorporate a variety of different groups, radicals, etc., so that in the case of various complex amino-compounds the product is modified in certain respects by virtue of the presence of one group or radical, and in other respects by virtue of the presence of another group or radical. Thus, composite or compound effects may be secured.

Treatment conditions

With regard to treatment conditions it may be noted that anywhere from a trace, for instance .1% of the amino-compound up to about 10% is usually found satisfactory, from about 2% to about 5% normally yielding good results. For special purposes larger amounts may be used, for instance up to about 30%.

The temperature of treatment should be within a range extending from about 100° C. to about 350° C. but not above the point at which appreciable destructive distillation of the rosin will take place. Usually temperatures from about 200° C. to 310° C. are employed.

The time of treatment at the reaction temperature may be varied over a considerable range although the time usually need not be more than a few hours, for instance from about 1 hour to about 5 hours is required. In some cases modification is brought about quite rapidly and the batch may be permitted to cool almost immediately upon attaining the desired treatment temperature.

Frequently the reaction is desirably carried out in the absence of air, or out of contact with any substantial quantity of air. For this purpose the reaction may be carried out in a closed vessel, though not necessarily at a positive pressure, so that the gases or fumes of the reaction released from the modifying agent serve to exclude the air. For some purposes positive pressure may be used.

Vacuum is also effective for the purpose of excluding air, and in addition, reduction in contact of air may be brought about by blanketing the surface of the reaction mixture with some inert gas, such as $SO_2$, $CO_2$, or nitrogen, or by bubbling such gases through the mass. Where vacuum is used, a pressure, for instance, of about 100 mms. Hg to about 450 mms. Hg will be found effective, although higher or lower may be used. Vacuum serves to take-off volatile reaction products, for instance, water, if any is formed. Whatever means or procedure is employed, in many cases it is of advantage to so conduct the process as to reduce oxygen concentration in the reaction vessel and prevent entrance of fresh air or oxygen to the reaction mixture.

Various gases may be employed for their supplemental effect during the treatment procedure and gases for various purposes may either be employed as a blanket on the surface of the batch undergoing treatment or may be bubbled through the reaction mixture.

Supplemental treating agents may be present during the reaction, among which might be mentioned dissolution promoting agents of the type described in my issued Patent No. 2,293,038.

Some more or less general considerations regarding the process should be noted, as follows:

Although the complete mechanism of modification may not be fully understood, it may be mentioned that rosin is an organic isocolloid, i. e., a colloidal system in which the dispersed phase and the dispersion medium are both of the same chemical compositions, though present in different physical states.

By modification I believe that the relationship or relative proportions of the dispersed phase and dispersion medium may be altered.

Whatever the exact nature of the chemical, colloidal and/or physical changes which are brought about, various advantageous modifications in properties may result, depending upon the particular modifying agent selected and the treatment conditions employed.

In considering the starting material on which the process may be employed, it is first noted that the process brings about changes both of a colloidal and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pretreated in various ways, or on mixed or chemically condensed materials incorporating rosin, since the reaction will take place wherever the rosin molecule is present provided, of course, that the physical or chemical state or "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resin behaves similarly to rosin, it is herein considered as an equivalent.

Copals are fossil gums which have to be "fused" before becoming soluble in organic solvents and miscible with fatty oil. When copals are used in the present process, they should be employed in the fused state.

The modified product of this invention may if desired, be subject to other treatment, depending upon the use for which it is intended. Thus, for example, the modified products may be vulcanized with sulfur. The modified resin products secured in accordance with the foregoing, may be vulcanized as such, by application of heat, or in solutions, such as varnish solutions (in the latter case with sulfur chloride).

In the examples given below, melting point determinations were made by the Mercury method, and iodine value determinations were made by the Wijs method.

EXAMPLES

Example 1

A batch of 300 grams of rosin was heated in a 3-liter Pyrex distilling flask, together with 15 grams of aniline salt.

Direct heating was applied, raising the temperature to from 290 to 310° C., which temperature was maintained for about 5 hours. During the treatment a vacuum pressure of 8 to 17 inches of mercury was employed, i. e., 8 to 17 inches pressure reduction from atmospheric. About 20 minutes were required to reach about 292° C. and dissolution of the modifying agent occurred about 20 minutes after reaching that temperature.

The product was a relatively soft golden brown solid displaying only very little darkening as compared with the untreated material.

*Comparative Examples 2 to 4*

In the following examples the treatment conditions were similar in each case. In each example WW wood rosin (Newport Industries) was employed as the starting material, this rosin having the following characteristics:

Acid number_____ 166.4
Saponification No_____ 172
Iodine number_____ 192.2
Melting point_____°C__ 82.0

*Example 2*

The modifying agent employed in this example was 4 amino 1,3 dimethylbenzene. The yield was about 97% and the product was of very light color, having the following characteristics:

Acid number_____ 124.5
Saponification No_____ 136.5
Iodine number_____ 162.8
Melting point_____°C__ 77.5

Although the amine compound here employed contains some substitutions, the substituents are of such character as not to materially influence the properties of the product, so that the modification of properties was in at least major part due to the amine groups of the compound. This is in contrast with Examples 3 and 4 below, wherein certain of the substituents present materially influenced the properties of the product, beyond or differently from the modifications brought about by the amine groups of the compounds there used.

*Example 3*

In this example the modifying agent was m-nitro aniline.

During the treatment, when the temperature had passed about 200° C., the material became of a dark brownish-yellow color. The yield was 95.4%. Characteristics of this product were as follows:

Acid number_____ 118.5
Saponification No_____ 122
Iodine number_____ 150.8
Melting point_____°C__ 91.5

Here it will be noted that an appreciable increase in melting point is shown, apparently because of the nitro-group in the compound.

*Example 4*

In this example the modifying agent was 2,4 dichloroaniline.

The yield here was 89.5%, the product being of very light color, having characteristics as follows:

Acid number_____ 122.0
Saponification No_____ 133
Iodine number_____ 154.1
Melting point_____°C__ 66.5

Still another composite action shows up in this example. The halo portion of the compound apparently influenced the melting point, effecting an appreciable reduction, as will be seen from comparison with the melting point of the untreated material (82.0° C.)

I claim:

1. A process for modifying the properties of rosin comprising heating the rosin to a temperature between about 100° C. and about 310° C. in the presence of from about 0.1% to about 10% of an aromatic amino-compound selected from the class consisting of amino-compounds having the following general formula, and salts thereof:

where
R = at least 1 aryl radical
X = A substituent of the class consisting of nitro-, sulfo-, halo-, alkyl-, aryl-, aralkyl-, acyl-, aracyl-, hydroxy, CHOH, carboxy, CHO, azo, SH, CN, CO, CS and SO radicals, and sulfur and oxygen
a = 0—6

2. A process in accordance with claim 1 in which the treatment temperature is at least about 200° C.

3. A process in accordance with claim 1 in which the quantity of amino-compound is between about 2% and about 5% of the rosin.

4. A modified rosin comprising rosin reacted with from about .1% to about 10% of an aromatic mono-primary amino-compound.

5. A process for modifying the properties of rosin comprising heating the rosin to a temperature between about 100° C. and 310° C. in the presence of from 0.1% to about 10% of beta-naphthylamine.

6. A process for modifying the properties of rosin comprising heating the rosin to a temperature between about 100° C. and 310° C. in the presence of from 0.1% to about 10% of alpha-naphthylamine.

7. A process for modifying the properties of rosin comprising heating the rosin to a temperature between about 100° C. and 310° C. in the presence of from 0.1% to about 10% of a mono-amino-benzene.

8. A process for modifying the properties of rosin comprising heating the rosin to a temperature between about 100° C. and 310° C. in the presence of from 0.1% to about 10% of a naphthylamine.

9. A process in accordance with claim 1 in which R is one benzene radical and a is at least 1.

LÀSZLÓ AUER.